United States Patent Office

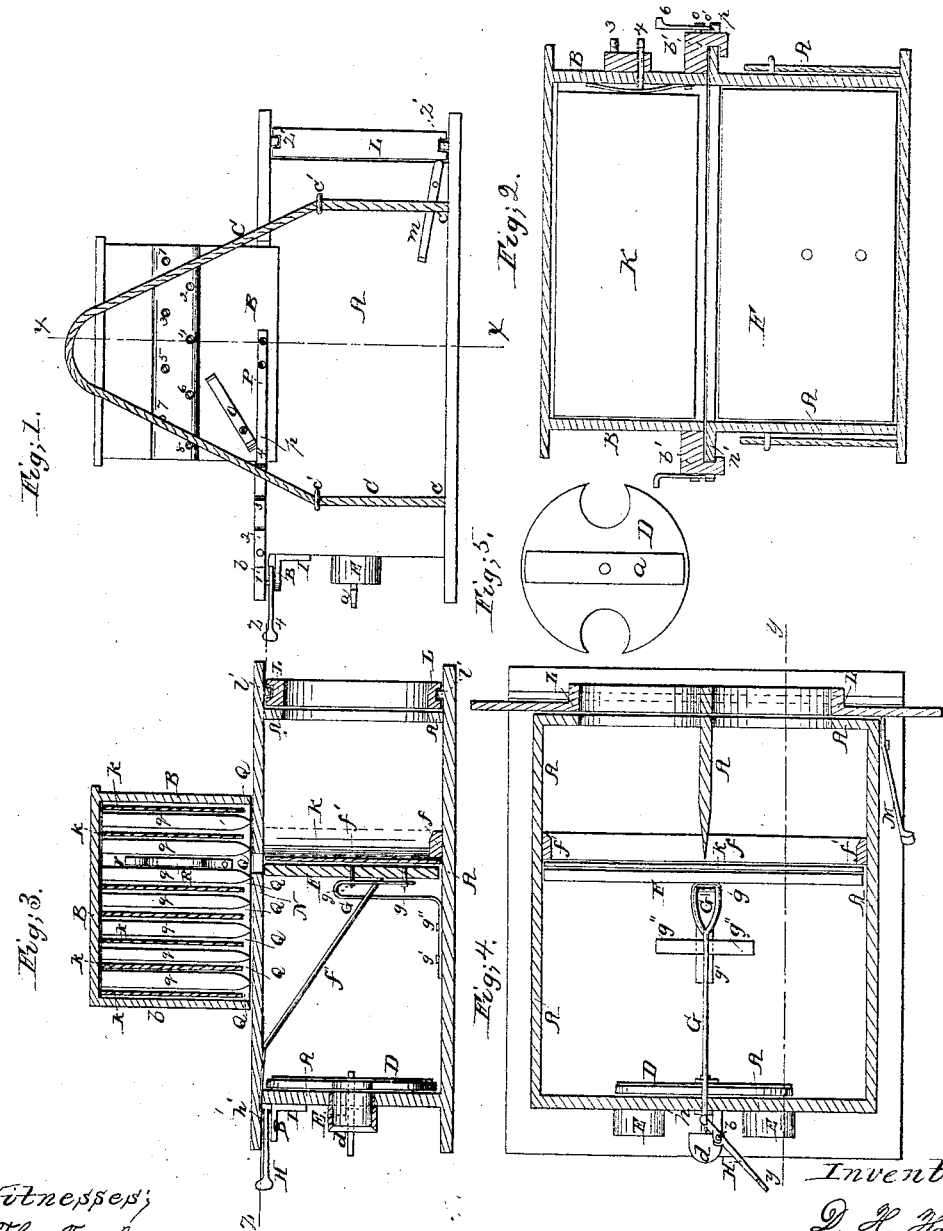

DAVID H. HOUSTON, OF CAMBRIA, WISCONSIN.

Letters Patent No. 67,981, dated August 20, 1867.

IMPROVEMENT IN PHOTOGRAPHIC APPARATUS.

The Schedule referred to in these Letters Patent and making part of the same.

TO ALL WHOM IT MAY CONCERN:

Be it known that I, DAVID H. HOUSTON, of Cambria, in the county of Columbia, and State of Wisconsin, have invented new and useful improvements in Photographic Apparatus; and I do hereby declare that the following is a full, clear, and exact description thereof, which will enable others skilled in the art to make and use the same, reference being had to the accompanying drawings, forming part of this specification.

This invention relates to improvements in the apparatus used in photographic manipulation, and has for its objects, first, the carrying a large number of prepared sensitive plates in a single frame, at the same time increasing the portability of the equipment of the photographer; second, the more complete exclusion of light from the sensitive plate up to the very moment it is to be exposed, and after exposure; third, the substitution of a single frame, which I call a carrying-frame, for numerous carrying-frames which are entirely dispensed with; fourth, the automatic adjustment of the sensitive plate in the camera, and returning the same to the carrying-frame after exposure; fifth, simplifying the manipulations of the photographic process; and, sixth, avoidance of actinic action. In the accompanying drawings—

Figure 1 is a side view of my improved apparatus, showing the camera with my carrying-frame adjusted upon it ready for use.

Figure 2 is a transverse vertical section at the line $x\ x$, showing the frame adjusted on the camera.

Figure 3 is a vertical longitudinal section at the line $y\ y$, showing the sensitive plate in place to be exposed.

Figure 4 is a horizontal section at the line $z\ z$, showing the sensitive plate in the same position as in fig. 3.

Figure 5 shows the diaphragm detached from the camera.

The same letters and figures refer to the same parts in all the drawings.

A A A A is the framework of the camera; B B B the framework of my carrying-frame. C is a cord for slinging the apparatus attached to the foot of the camera at $e$, and passes through the eye $e'$. A similar cord (not shown) is attached in a similar manner to the opposite side of the camera. The instrument may be furnished with any other appropriate means for slinging the same. A diaphragm, D, movable by means of the thumb-key $d$, opens the eye-holes E, or shuts off the light, as desired. The ground glass F F, on which the object or view is to be focused is pressed firmly in place against the foot $f$ and the supports $f'$, figs. 3 and 4, by the S spring G, attached to it by the rivets $g\ g$, or by any other appropriate method, and to the floor of the camera by the bolts $g'$, and, by a narrow strip of brass, $g''\ g''$, or other suitable material, stretched across its foot as a brace, and bolted to the floor of the camera on both sides of the spring G, as shown in the drawing, or any other appropriate mode of attachment may be employed, so as to preserve the elasticity of the spring G. The glass F may be of yellow or orange-colored glass, to absorb the actinic rays and prevent their being reflected back upon the sensitive plate. H, figs. 1, 3, and 4, is a lever, whose fulcrum is at $h$, secured to the bracket I by the bolt $h$, which may pass through the lid of the camera N, assisting to secure the latter. The ground glass F is connected with the short arm $h'$ of the lever H by a wire, $f''$, or by any other appropriate method, in such manner that by pressing on the long arm of the lever H the pressure of the spring G is overcome, and the ground glass F is retired, so as to allow the sensitive plate K to be received between it and the foot $f$ and supports $f'$, as shown in figs. 3 and 4, as hereafter more fully described. L is a sliding frame, bearing the lenses in the usual manner, but sliding horizontally, and carrying two grooves, into which projections fit from the foot and lid of the camera, as shown at $l'$, figs. 1 and 3. M, figs. 1 and 4, is a lever, by which the sliding frame L is securely bolted in place, or the same object may be obtained by any of the other well-known appropriate methods. N is the lid of the camera, having a transverse slit or slot, U, figs. 2 and 3, through which the sensitive plate K is allowed to fall from the carrying-frame, as hereinafter described. The lid N overlaps the camera at the sides, as shown at $n'\ n'$, fig. 2, and carries a notched or grooved and numbered scale, 1, 2, 3, &c., as shown in fig. 1. The grooves or notches will be placed upon the scale, beginning from the slot U, at a distance from it equal to the thickness of the end of the framework $b$ of the carrying-frame B, and the distance of the notches will be determined from dimensions on the carrying-frame, as hereafter described. The length of the carrying-frame B is a little more than half the length of the camera, and is divided by dwarf partitions $q$ in its interior into as many compartments for sensitive plates as it can carry, not exceeding in number the number of grooves upon the scale on the lid N. A slip, R, of brass, or of suitable material, is secured by the pin $r$ in each compartment Q, and the screw-keys numbered 1, 2, 3, &c., fig. 1, corresponding with the numbers on the scale on the lid N, press, when in action, the slips R against the sensitive plates K, k k k holding the latter firmly secured in their several compartments Q Q, and when withdrawn so that the slip R no longer presses against the plates K K, leave the latter free to fall through the slot U, as hereinafter described, or the plate to be removed, at the pleasure of the operator. The carrying-frame, and the means here shown for securing the sensitive plates, may be applied to secure microscopic and stereoscopic slides or pictures in compartments in cases and boxes for travelling. The distance between each groove or notch on the scale is equal to the width of a partition and compartment of the carrying-box jointly, or, which is the same, to the horizontal distance of two consecutive screw-keys. If, as in the drawing, the scale is numbered from left to right, the screw-keys and compartments of the carrying-frame will be numbered from right to left. The reason for this arrangement will be more apparent when I proceed to describe the mode in which my apparatus is used. The carrying-frame B bears a groove, $b'$, fig. 2, at each side, fitting into the overlapping sides of the lid N. O, figs. 1 and 2, is a lever, secured to the side of the carrying-frame by the bolt or fulcrum $o$, and, when raised, its small arm $o'$ lifts the catch $p$ of the spring P out of the groove, and enables the carrying-frame to slide along the lid N. When the arm O is lowered the small arm $o'$ is withdrawn, and the catch $p$ falls into the first groove left behind by the carrying-frame in its passage along the lid N. In fig. 1 the catch $p$ is shown in notch 4. The section, fig. 2, being shown through the slot U, cuts through the carrying-frame at plate or compartment 4, and the screw-key No. 4 is shown in action, fig. 2, holding the sensitive plate K in its compartment in the carrying-frame.

I now proceed to describe the mode in which my improved photographic apparatus is to be employed.

The keys numbered 1, 2, 3, &c., on the carrying-frame B, being loosened by a half turn to the left, slip a prepared sensitive plate, K $k$, into each compartment Q until the frame B contains as many plates as views are desired. Then, by a half turn of each key to the right, press the slips R against the plates, securing the latter in the frame B. Slide the carrying-frame B by its grooves $b'$ along the lid N until the catch $p$ of the spring P falls into one of the notches or grooves carried on the overlapping portion of the lid N. The eye-holes E being closed by the diaphragm D, and the object-lenses inserted in the apertures and closed, the instrument is ready for use, and may be carried about with perfect safety. When desired to take a picture, having placed the camera on its stand, the carrying-frame being fixed upon it as above described, open the eye-holes by turning the diaphragm D by a quarter turn of the thumb-key $d$, and focus in the usual manner. Close the eye-holes E by another quarter turn of the diaphragm D. Now raise the small lever O so that the arm $o'$ raises the catch $p$ of the spring P out of the notch or groove into which it fell, and slide the carrying-frame until the end $b$ passes the groove of the number of the plate next before the one it is intended to expose. Lower the lever O, and continue to slide the carrying-frame B until the catch $p$ falls into the next groove, in the drawing No. 4. Give the screw-key, No. 4 in the drawing, of the same number, a turn and a half to the left, thereby releasing the slip R from the plate K, and leaving the latter loose in its compartment over the slot U, through which it falls, and rests on the ground glass F. Press with the thumb on the lever H at the back of the camera, thereby drawing back the ground glass F, and allowing the sensitive plate K to fall into the camera in front of the ground glass F. Release the lever H, when the S spring G will press forward the ground glass F, and the sensitive plate K will be firmly held in place between the ground glass F and the foot $f$ and supports $f'$, as shown in figs. 3 and 4. Having exposed the plate, shut off the light from the lens, and, pressing on the lever H, turn the camera over until the plate drops back into the old compartment Q in the carrying-frame B. Give a turn and a half to its proper screw-key, No. 4 in the drawing, when the plate will be again secured in the carrying-frame B. Care must be taken not to screw up the glass too tightly, lest the glass should break or the frame be strained. Now turn the camera right side up upon the stand, and another view can be taken by sliding the carrying-frame, as before, until the catch $p$ falls into the groove or notch of the number of the plate it is desired to expose, and repeating the process as described.

Having thus described my invention, what I claim as new, and desire to secure by Letters Patent, is—

1. The securing the ground glass F by the S spring G, movable by means of the lever H, substantially as described.

2. Securing the sensitive plate K in place when exposed in front of the ground glass F, in the manner and by the means substantially as described.

3. The grooved and numbered scale carried on the lid of the camera, substantially as described.

4. The employment of orange or yellow-colored glass, on which to focus the object or view, in manner and for the purposes substantially as described.

5. The construction of the diaphragm D, as herein set forth for the purpose specified.

6. The employment of the keys to secure the sensitive plate in place in the carrying-frame, with or without the slips R, substantially as described.

7. The application of the spring G for securing the sensitive plate in the camera, substantially as described.

8. The employment of an adjustable spring at one or both ends of the sensitive plate, whereby the same is secured or loosened at pleasure in the carrying-frame, substantially as described.

9. The application of the spring P and lever O as attached to the carrying-box, substantially as and for the objects desired.

10. The carrying-frame B, constructed as described, when combined with the camera A, as and for the purpose specified.

DAVID H. HOUSTON.

Witnesses:
R. W. ROBERTS.
W. L. CLARK.